US005482383A

United States Patent [19]
Gantt et al.

[11] Patent Number: 5,482,383
[45] Date of Patent: Jan. 9, 1996

[54] BEARING HAVING MULTI-SIDED INNER RING BORE WITH ELASTOMERIC RINGS

[75] Inventors: Michael A. Gantt, Granby; John A. Larson, New Hartford, both of Conn.

[73] Assignee: The Torrington Company, Torrington, Conn.

[21] Appl. No.: 357,803

[22] Filed: Dec. 16, 1994

[51] Int. Cl.⁶ .................................................. F16C 33/58
[52] U.S. Cl. ............................ 384/513; 384/536; 384/537
[58] Field of Search .................................... 384/513–515, 384/569–571, 220, 536, 582, 537

[56] References Cited

U.S. PATENT DOCUMENTS

| T981,004 | 4/1979 | McNeely | 384/536 |
|---|---|---|---|
| 2,162,159 | 6/1939 | Cole | 384/536 |
| 2,165,155 | 7/1939 | Schmal | 384/536 |
| 4,336,971 | 6/1982 | Reiter | 384/571 |

*Primary Examiner*—Lenard A. Footland
*Attorney, Agent, or Firm*—John C. Bigler

[57] ABSTRACT

There is disclosed a bearing for mounting on a multi-sided shaft having an outer race and an inner race coaxial with and rotatable relative to the outer race. The inner race is formed with a central bore having a plurality of internal corners which accommodate a multi-sided shaft. The central bore is preferably adapted to accommodate hexagonal and square shafts. The central bore has at least one circumferential groove in the bore and an elastomeric ring mounted into the groove. The grooves are formed at such depth that the elastomeric ring is exposed at the internal corners of the central bore whereby when the bearing is mounted the elastomeric material will contact the shaft and dampen the relative motion between the bearing and the shaft.

8 Claims, 2 Drawing Sheets

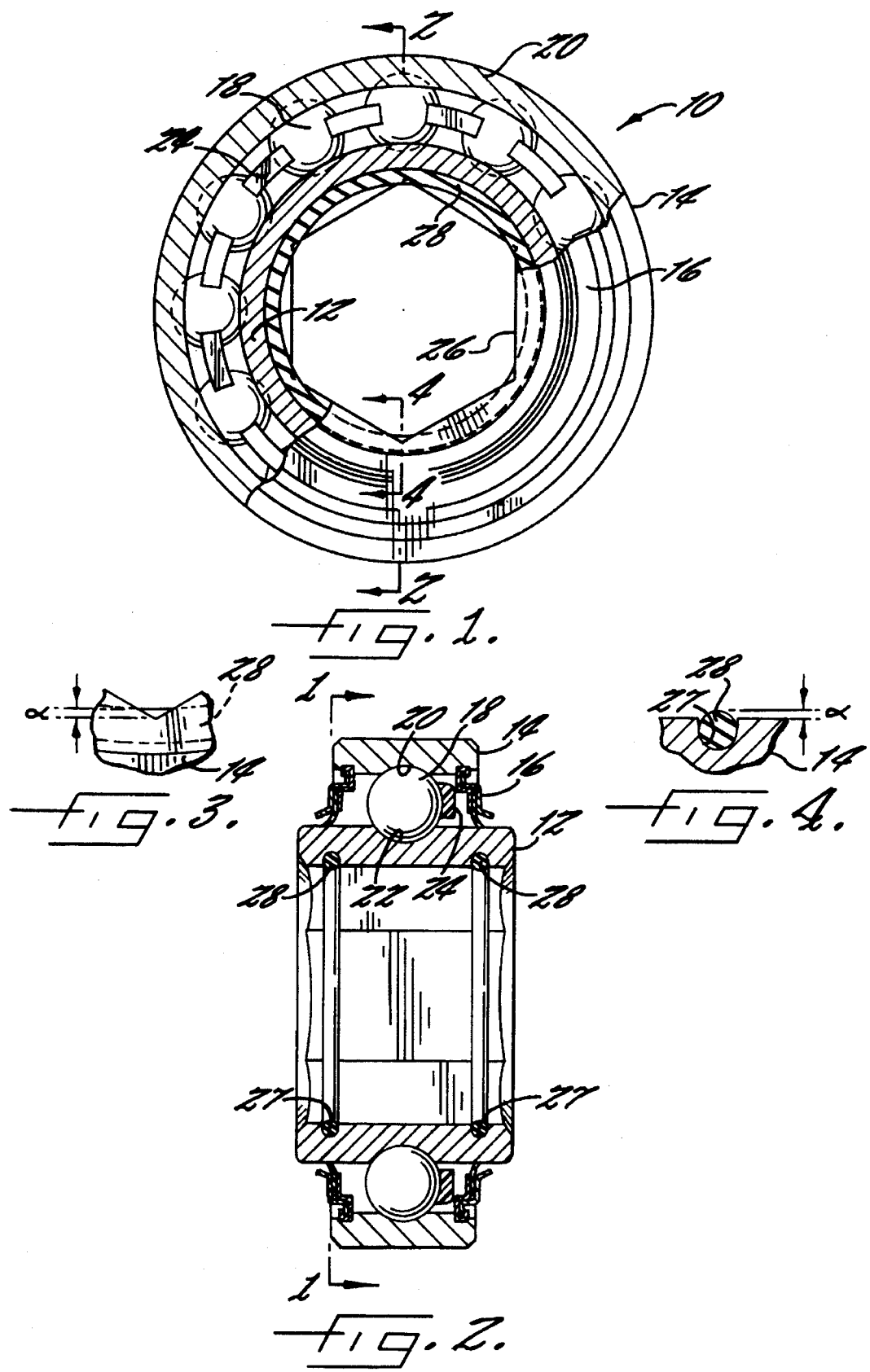

னையதனை5,482,383

BEARING HAVING MULTI-SIDED INNER RING BORE WITH ELASTOMERIC RINGS

BACKGROUND OF THE INVENTION

This invention relates generally to shaft-mounted bearings, and more particularly to bearings having hexagonal and square inner race bores with elastomeric O-rings for mounting on hexagonal and square shafts.

Multi-sided bore bearings are commonly used in numerous applications. One such particular use is in agricultural machinery, such as for example, with disc harrows. The multi-sided bore within the inner race of such bearings is positioned over a mid-portion of a complementary multi-sided shaft to prevent the motion of the inner race relative to the shaft. In such bearings, it is desirable to have the inner race fit with the shaft on which it is mounted so that play between the inner race and the shaft is eliminated.

While the dimensional tolerance between the shaft and the interior surfaces of the inner bore will vary, the tolerance or play is approximately 0.005 inch. Variations in the bore dimensions may be due to distortions caused by broaching the bores in the soft state before hardening or to the heat treatment of the inner race after broaching. Also, broach tool tolerances, tool wear and gauging errors may add to tolerance build-up which results in the play between the shaft and the bore causing an undesirable amount of noise during operation.

Under ideal circumstances, the shaft and the inner bore would fit perfectly but as the dimensional tolerance gets tighter, the costs of achieving the tighter tolerance increases. Thus, the provision of a low cost bearing using current manufacturing techniques generally means there will be some play between the shaft and the central bore of the inner race. Present manufacturing methods provide that all bearings are made with a bore no larger than the maximum size of the shaft to be fitted. The shafting is generally cold drawn and has an associated dimensional tolerance of approximately 0.004 inches. Thus, if a particular shaft is 0.004 inch under nominal size and a bearing bore is 0.005 inch over nominal size, the result is in an undesirable amount of play.

The manufacturing clearance between the shaft and the central bore may adversely affect the bearing life, noise, shaft threading, and maximum rotational speed of the bearing. Additional clearance may result from the wear of the shaft or the bore of the bearing during use, increasing the adverse effects. A number of means for preventing motion of the inner race relative to the shaft such as an eccentric collar, cam lock, or screw set on the collar result in increased cost and require additional axle length. In addition, such alternative retention devices may loosen during use and allow the inner race to rotate with the shaft. It is thus desirable to provide a means for reducing the noise problem that exists with bearings having multi-sided inner race bores.

The foregoing illustrates limitations known to exist in the present bearings for mounting on multi-sided shafts. Thus, it is apparent that it would be advantageous to provide an alternative directed to overcoming one or more of the limitations set forth above. Accordingly, a suitable alternative is provided including features more fully disclosed hereafter.

SUMMARY OF THE INVENTION

In one aspect of the invention, this is accomplished by providing a bearing for mounting on a multi-sided shaft having an outer race and an inner race coaxial with and rotatable relative to the outer race, the inner race formed with a central bore having a plurality of internal corners which accommodates a multi-sided shaft. The central bore has at least one circumferential groove in the bore and has an elastomeric ring mounted into the groove. The groove is of such depth that the elastomeric ring is exposed at the internal corners of the central bore whereby when the bearing is mounted the elastomeric material will contact the shaft at the shaft's exterior corners. Thus, the elastomeric ring will dampen relative motion between the bearing and shaft. The invention is pertinent to multi-sided shafts, especially shafts that are hexagonal and square in cross-section.

The foregoing and other aspects will become apparent from the following detailed description of the invention when considered in conjunction with the accompanying drawing figures.

BRIEF DESCRIPTION OF THE DRAWING FIGURES

FIG. 1 is an end view, partially in section of an embodiment of the present invention;

FIG. 2 is a side view, in section, of the embodiment of FIG. 1 and indicating at 2—2 the sectioning of FIG. 1;

FIG. 3 is an exploded partial end view showing the elastomeric ring extending into the inner bore at an internal corner;

FIG. 4 is an exploded partial side view showing the elastomeric ring extending into the inner bore at an intersection of and internal corner;

DETAILED DESCRIPTION

Figure 5:
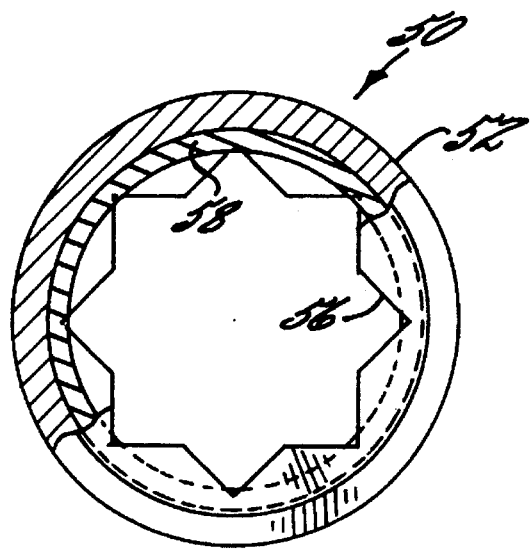
FIG. 5 is an end view, partially in section, of another embodiment of the present invention.

Referring now to the drawings, FIG. 1 illustrates a bearing 10 of the present invention. The bearing 10 includes an outer race 14, an inner race 12 coaxial with and rotatable relative to the outer race. An outer raceway 20 and an inner raceway 22 are provided within the outer and inner races 12 and 14, respectively. The rolling elements 18 may be a full complement and may be separated by a cage or retainer 24. The rolling elements 18 are disposed in the space between outer raceway 20 and inner raceway 22. A seal 16 covering the rolling elements 18 is provided. The inner race 12 is provided with a central bore 26 having a plurality of internal corners adapted to receive a shaft of complementary cross-sectional shape. In a preferred embodiment the central bore 26 has a hexagonal shaped cross-section.

The inner race 14 has at least one circumferential groove 27 formed in the wall of the central bore 26 of the inner race 14. The groove may have a semi-circular cross-section. As shown more clearly in FIG. 2, an elastomeric ring 28 is mounted into the circumferential groove 26. As shown in FIGS. 3 and 4, the depth of the circumferential groove 26 should be such that the elastomeric ring 28 is exposed at the internal corners of the central bore 26 as shown by distance $\alpha$. The distance $\alpha$ is such that when the bearing is mounted onto the shaft, the elastomeric ring will contact the shaft. Preferably there are at least two circumferential grooves in the central bore 26 of the inner ring, as shown in FIG. 2. The elastomeric ring will dampen relative motion of the bearing and the shaft. The elastomeric ring is made of a suitable elastomeric material having both the resiliency and the degree of hardness or resistance to yielding required to effect the dampening of the noise without permanent deformation. Suitable elastomeric materials include polyethylene, natural rubber and synthetic rubber.

A second preferred embodiment of the present invention is indicated as bearing 50 in FIG. 5. The bearing 50 includes an outer race (not shown), and inner race 52 having a central bore 56 having a 8-pointed star-shaped configuration defined by the superposition of two squares. This central bore 56 is sized to accommodate either a square shaft or an octagonal shaft. The central bore 56 has one or more circumferential grooves having an elastomeric ring 58 mounted in each groove so that the ring is exposed at the internal corners of the central bore and when the bearing is mounted onto the shaft the elastomeric ring will make contact with the shaft.

Figure 6:
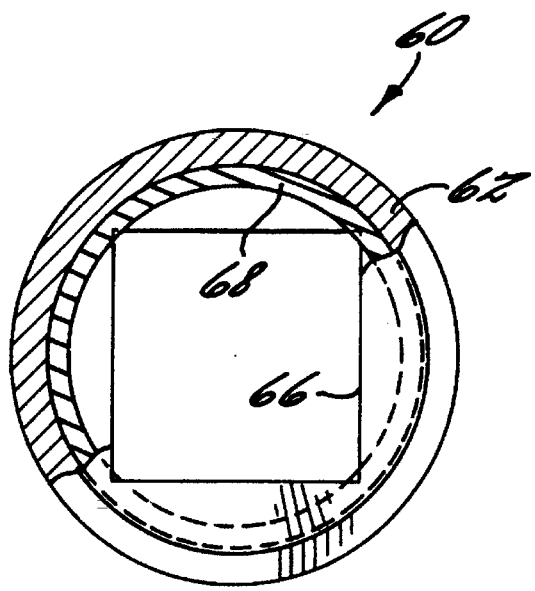
FIG. 6 is an end view, partially in section, of another embodiment of the present invention.

FIG. 6 illustrates another preferred embodiment of the present invention wherein the inner race 62 of a bearing 60 is shown. The inner race 62 has a central bore 66 which has four internal sides and is sized to accommodate a square shaft. The central bore 66 has at least one circumferential groove and an elastomeric ring 68 mounted in each groove.

Figure 7:
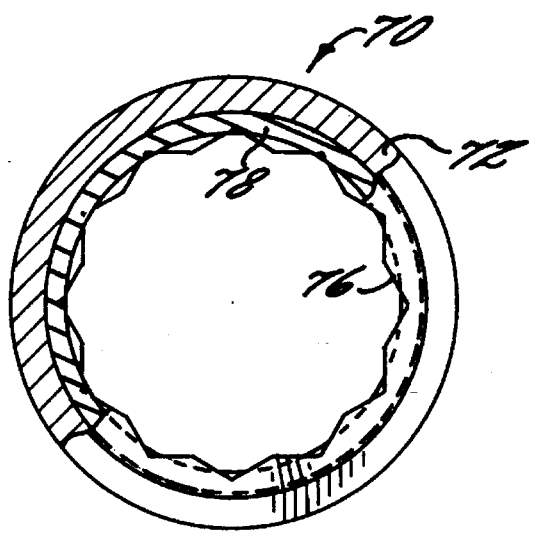
FIG. 7 is an end view, partially in section, of another embodiment of the present invention.

As shown in FIG. 7, there is another embodiment of a bearing 70 having an outer race (not shown) and an inner race 72 having a multi-sided central bore 76. The central bore 76 is adapted to accommodate a hexagonal shaft or a shaft having twelve sides. The central bore 76 has at least one circumferential groove and an elastomeric ring 78 mounted in each groove so that the ring is exposed at the internal corners of the central bore.

Although bearings for mounting on hexagonal and square shafts are specifically illustrated in the drawings, it will be apparent that the present invention is applicable to bearings for mounting on other multi-sided shafts having an internal corner in which the elastomeric ring can make contact with a portion of the shaft.

Each of the described variations of the present invention results in a tighter fit between a multi-sided shaft and the bearings with no change in manufacturing dimensional tolerances. The invention provides a significant reduction in noise by interposing the elastomeric ring between the metal shaft and the walls of the central bore of the bearing inner race which otherwise would cause noise in the usual operation of the bearing. Bearing life and load capacity are also improved. Such bearings can operate at higher speeds and with reduced wear of the bearing bore and the shaft.

While this invention has been illustrated and described in accordance with preferred embodiments, it is recognized that other variations and changes may be made therein without departing from the invention as set forth in the claims.

Having described the invention, what is claimed is:

1. A bearing for mounting on a multi-sided shaft, the bearing comprising:

an outer race;

an inner race coaxial with and rotatable relative to the outer race, said inner race formed with a central bore having a plurality of internal corners which accommodates said multi-sided shaft; and said central bore having at least one circumferential groove in the bore and having an elastomeric ring mounted into said groove, said groove being at such depth that the elastomeric ring is exposed at said internal corners of the central bore whereby when said bearing is mounted said elastomeric material will contact said shaft.

2. The bearing according to claim 1 wherein said central bore has two circumferential grooves.

3. The bearing according to claim 1 wherein the central bore of the inner race is hexagonal in cross-section.

4. The bearing according to claim 1 wherein the central bore of the inner race has an octagonal star-shaped configuration which accommodates a square shaft in two positions.

5. The bearing according to claim 1 further comprising a plurality of roller elements disposed between said outer race and said inner race.

6. A bearing for mounting on a hexagonal shaft, the bearing comprising:

an outer race;

an inner race coaxial with and rotatable relative to the outer race, said inner race formed with a central bore having a plurality of internal corners which accommodates the hexagonal shaft; and said central bore having at least one circumferential groove in the bore and having an elastomeric ring mounted into said groove, said groove being at such depth that the elastomeric ring is exposed at said internal corners of the central bore whereby when said bearing is mounted said elastomeric material will contact said shaft.

7. The bearing according to claim 6 wherein said central bore has two circumferential grooves.

8. The bearing according to claim 6 further comprising a plurality of roller elements disposed between said outer race and said inner race.

\* \* \* \* \*